(12) United States Patent
Kawazoe et al.

(10) Patent No.: US 8,477,322 B2
(45) Date of Patent: Jul. 2, 2013

(54) SURVEILLANCE DEVICE AND SURVEILLANCE METHOD

(75) Inventors: Kohei Kawazoe, Nagasaki (JP);
Tomoyoshi Baba, Nagasaki (JP);
Katsutoshi Ochiai, Nagasaki (JP);
Kiyotoshi Nishimura, Nagasaki (JP);
Toshiyuki Yamada, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 78 days.

(21) Appl. No.: 13/130,809

(22) PCT Filed: Dec. 11, 2009

(86) PCT No.: PCT/JP2009/070738
§ 371 (c)(1),
(2), (4) Date: Jun. 21, 2011

(87) PCT Pub. No.: WO2010/067858
PCT Pub. Date: Jun. 17, 2010

(65) Prior Publication Data
US 2011/0249273 A1    Oct. 13, 2011

(30) Foreign Application Priority Data

Dec. 12, 2008    (JP) .................................. 2008-317200

(51) Int. Cl.
*G01B 11/14*    (2006.01)
*G01N 21/55*    (2006.01)

(52) U.S. Cl.
CPC ............... *G01B 11/14* (2013.01); *G01N 21/55* (2013.01)
USPC .......................................... 356/614; 356/445

(58) Field of Classification Search
CPC .................................. G01B 11/14; G01N 21/55
See application file for complete search history.

(56) References Cited

U.S. PATENT DOCUMENTS

| | | | |
|---|---|---|---|
| 5,164,823 A | 11/1992 | Keeler | |
| 5,822,047 A * | 10/1998 | Contarino et al. | 356/5.01 |
| 6,836,285 B1 * | 12/2004 | Lubard et al. | 348/31 |
| 6,985,212 B2 * | 1/2006 | Jamieson et al. | 356/5.01 |

(Continued)

FOREIGN PATENT DOCUMENTS

| | | |
|---|---|---|
| JP | 04-301784 | 10/1992 |
| JP | 5-249241 | 9/1993 |
| JP | 2003-308599 | 10/2003 |
| JP | 2007-218806 | 8/2007 |

OTHER PUBLICATIONS

International Search Report issued Mar. 9, 2010 in International (PCT) Application No. PCT/JP2009/070738.

*Primary Examiner* — Michael P Stafira
(74) *Attorney, Agent, or Firm* — Wenderoth, Lind & Ponack, L.L.P.

(57) ABSTRACT

A desired search area is efficiently monitored. A surveillance device that is installed in a flying aircraft in the sky and that monitors the situation at the sea surface from the sky, including a light-transmitting portion that is provided with a light source and that radiates a plurality of slit-like beams from the sky toward a search area at the sea surface, a light-receiving portion that receives a plurality of reflected beams that have been reflected at an object at the sea surface, and a processor that determines whether or not the object at the sea surface that has reflected the beams is a target object from information about the reflected beams obtained by the light-receiving portion.

20 Claims, 5 Drawing Sheets

U.S. PATENT DOCUMENTS

| | | | |
|---|---|---|---|
| 7,095,488 B2 * | 8/2006 | Jamieson et al. | 356/5.01 |
| 7,683,928 B2 * | 3/2010 | Lubard et al. | 348/144 |
| 7,688,348 B2 * | 3/2010 | Lubard et al. | 348/144 |
| 2004/0141170 A1 * | 7/2004 | Jamieson et al. | 356/5.01 |
| 2004/0233414 A1 * | 11/2004 | Jamieson et al. | 356/4.01 |
| 2005/0225777 A1 * | 10/2005 | Falbel | 356/614 |
| 2006/0017939 A1 * | 1/2006 | Jamieson et al. | 356/622 |
| 2010/0002222 A1 * | 1/2010 | Lubard et al. | 356/4.01 |

* cited by examiner

SURVEILLANCE DEVICE AND SURVEILLANCE METHOD

TECHNICAL FIELD

The present invention relates to a surveillance device and a surveillance method.

BACKGROUND ART

With a known method in the related art for detecting objects, for example, when searching for people in distress at sea, vessels in distress at sea, etc., a slit-like beam is radiated from the sky on an area to be searched, using a helicopter, an airplane, etc., as shown in FIG. 5, and the object are detected by receiving a reflected beam from the object.

CITATION LIST

Patent Literature

{PTL 1}
Japanese Unexamined Patent Application, Publication No. 2007-218806.

SUMMARY OF INVENTION

Technical Problem

With the above-described method, however, because an area in a widthwise direction W1 of the slit beam is small, there is a problem in that a target object becomes hidden by waves at the sea surface when the band of the slit beam passes over it, and the target object is overlooked. In addition, although overlooking of the target object can be avoided by increasing the width of the slit beam, there is a problem in that energy for radiating the beam is required in an amount corresponding to the widening of the slit beam, and thus, it is not efficient.

The present invention has been conceived in order to solve the above-described problems, and an object thereof is to provide a surveillance device and a surveillance method that are capable of efficiently searching a wide area and reducing overlooking of a target object.

Solution to Problem

In order to solve the above-described problems, the present invention employs the following solutions.

A first aspect of the present invention is a surveillance device that is installed in a flying aircraft in the sky and that monitors the situation at the sea surface from the sky, including a light-transmitting portion that is provided with a light source and that radiates a plurality of slit-like beams from the sky toward a search area at the sea surface, a light-receiving portion that receives a plurality of reflected beams that have been reflected at an object at the sea surface, and a decision unit that determines whether or not the object at the sea surface that has reflected the beams is a target object from information about the reflected beams obtained by the light-receiving portion.

With such a configuration, the plurality of slit-like beams are radiated from the sky toward the search area at the sea surface with the light-transmitting portion provided with the light source, and the reflected beams thereof are received by the light-receiving portion. Then, it is determined whether or not the object at the sea surface that has reflected the beams is the target object on the basis of information about the plurality of the reflected beams received by the light-receiving portion. Because the slit-like beams are radiated in this way, the beams can be radiated over a wider area, and, furthermore, because the plurality of the slit-like beams are used, opportunities for irradiating the sea surface in one flight are increased, and a plurality of different search areas can be irradiated at the same time. Accordingly, the probability of finding a target object that would be overlooked in one flight can be improved. Note that the light source is, for example, a laser beam. In addition, the decision unit determines whether or not it is a target object on the basis of, for example, intensities of the reflected beams, positional information, the number of times reflected beams that exceed a predetermined intensity are received, and so on.

The surveillance device according to the first aspect of the present invention described above may include an input device for inputting a wave period and traveling velocity of the flying aircraft, wherein the distance between the slit beams or the traveling velocity of the aircraft is adjusted so that a value obtained by dividing the distance between the slit beams by the traveling velocity of the flying aircraft does not coincide with the wave period.

In this way, the distance between the slit beams or the traveling velocity of the flying aircraft is adjusted so that the value obtained by dividing the distance between the slit beams by the traveling velocity of the aircraft does not coincide with the wave period.

With the surveillance device according to the first aspect of the present invention described above, the light-transmitting portion may include a light source, at least an optical divider that is provided on an optical axis of a light emitted from the light source and that divides an incident light, and a slit-beam generator that is provided on an optical axis of an individual beam divided by the optical divider and that generates slit-like beam from the incident light.

With such a configuration, the beams output from the light source are divided by optical dividing means, and the individual beams that have been divided are guided to the slit-beam generators provided on the optical paths of the individual divided beams. The beams that have made incident on the slit-beam generators are converted to the slit-like beams and are output. Accordingly, the plurality of the slit beams can be generated with a simple configuration. The optical dividers are, for example, half-mirrors.

With the surveillance device according to the first aspect of the present invention described above, the slit-beam generator may include a concave lens that the beam divided by the optical divider enters, and a convex lens that the beam that has passed through the concave lens enters and that expands the slit-like beam to a desired angle.

With such a configuration, the individual beams that have been divided by the optical dividers are turned into the slit-like beams by being guided to the concave lenses and the convex lenses, in this order, provided on the optical paths of the beams. In addition, the convex lenses correspond to the second convex lenses in the embodiment in Description.

The surveillance device according to the first aspect of the present invention described above may include a second image acquisition device that is directed to a finding direction when a target object is found by the decision unit.

With such a configuration, when it is determined by the decision unit that the target object exists, the second image acquisition device is directed toward the target object; therefore, more detailed information about the target object can be obtained.

With the surveillance device according to the first aspect of the present invention described above, the light-transmitting portion may be provided with a light source that radiates a continuous beam, and the light-receiving portion may receive a reflected beam as the continuous beam.

With such a configuration, because the transmitted-light means is provided with the light source that radiates a continuous beam, omissions in irradiating the irradiation area and omissions in monitoring the surveillance area can be reduced and the search probability can be improved. In addition, because synchronization control is not required when the continuous beam is used, a burden on the device can be reduced. In addition, a case in which the continuous beam is used is, for example, when observation conditions are good, such as during fair weather.

With the surveillance device according to the first aspect of the present invention described above, the light-transmitting portion may be provided with a flash lamp or LED as the light source.

With such a configuration, because the device is simplified by employing the flash lamp or LED as the light source, handling and maintenance thereof become simple. In addition, because an excitation device, a cooling device, etc. employed in the case where the laser beam is employed are not required, it becomes possible to make the device compact and lightweight.

A second aspect according to the present invention is a surveillance method that is implemented in a flying aircraft in the sky, for monitoring the situation at the sea surface from the sky, including radiating a plurality of slit-like beams from the sky toward a search area at the sea surface, receiving a plurality of reflected beams that have been reflected at an object at the sea surface, and determining whether or not the object at the sea surface that has reflected the beams is a target object from information about the reflected beams.

Advantageous Effects of Invention

With the present invention, advantages are afforded in that a wide area can be efficiently searched and overlooking of a target object can be reduced.

DESCRIPTION OF EMBODIMENTS

An embodiment of a surveillance device according to the present invention will be described below with reference to the drawings.

Figure 1:
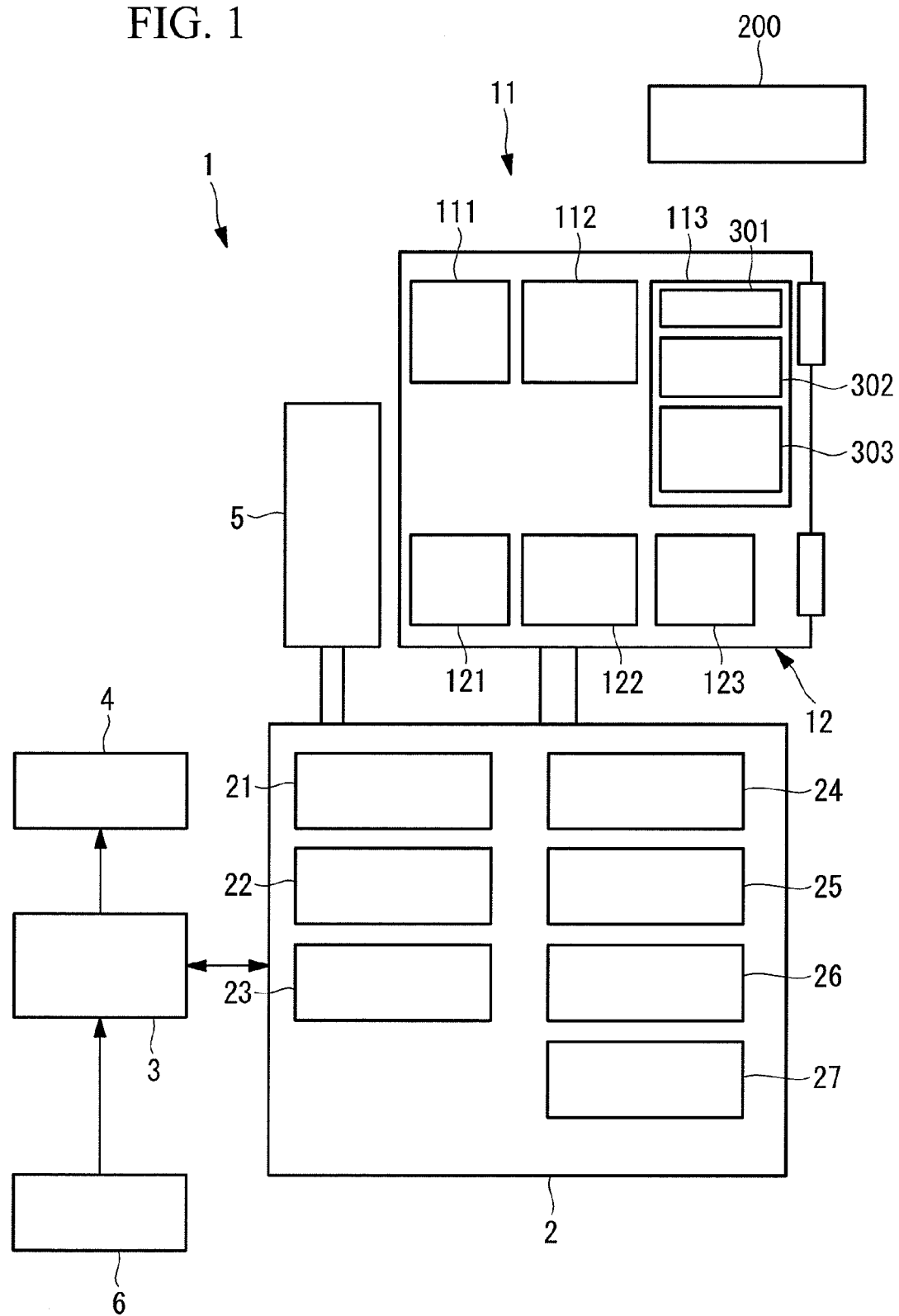
FIG. 1 is a block diagram showing, in outline, the configuration of a surveillance device according to an embodiment of the present invention.

A surveillance device according to this embodiment is a device that monitors the situation at the sea surface from the sky by being installed in a flying aircraft in the sky, such as a helicopter, an airplane, and so on, and is configured having a laser radar 1, a laser-radar control unit 2, a controller 3, a display device 4, a swiveling base 5, and an input device 6, as shown in FIG. 1. In addition, the laser radar 1 is configured having a light-transmitting portion 11 and a light-receiving portion 12.

The light-transmitting portion 11 includes a laser oscillator (light source) 111, a transmitted-light shutter 112, a transmitted-light lens system 113, and a transmitted-light lens actuator (not shown) as main components.

The laser oscillator 111 is a compact laser light source, such as a semiconductor laser, for example, and emits a laser beam, which is a continuous beam, by receiving power supplied from a laser power source 26 inside the laser-radar control unit 2.

The transmitted-light shutter 112 is provided between the laser oscillator 111 and the transmitted-light lens system 113 and is synchronously opened and closed with a received-light shutter 122 provided in the light-receiving portion 12, which is described later. Specifically, the opening and closing are performed by a shutter control unit 24 inside the laser-radar control unit 2, which is described later.

In addition, the transmitted-light lens actuator adjusts the position of the transmitted-light lens system 113 on the basis of control signals supplied from the laser-radar control unit 2, which is described later. Accordingly, the angle of a laser beam that enters the transmitted-light lens system 113 is adjusted, and the laser beam can be emitted to a desired area.

The transmitted-light lens system 113 generates a plurality of slit-like beams from the beam emitted from the laser oscillator 111 and radiates the plurality of the generated slit-like beams toward a search area at the sea surface from the sky. The transmitted-light lens system 113 is configured having optical dividers 301, slit-beam generators 302, and a slit-beam-emitting-direction deflector 303.

The optical dividers 301 are formed of at least one half-mirror 60 disposed on an optical axis of the beam emitted from a laser-emitting end and divide the light that is incident thereon.

Figure 2:
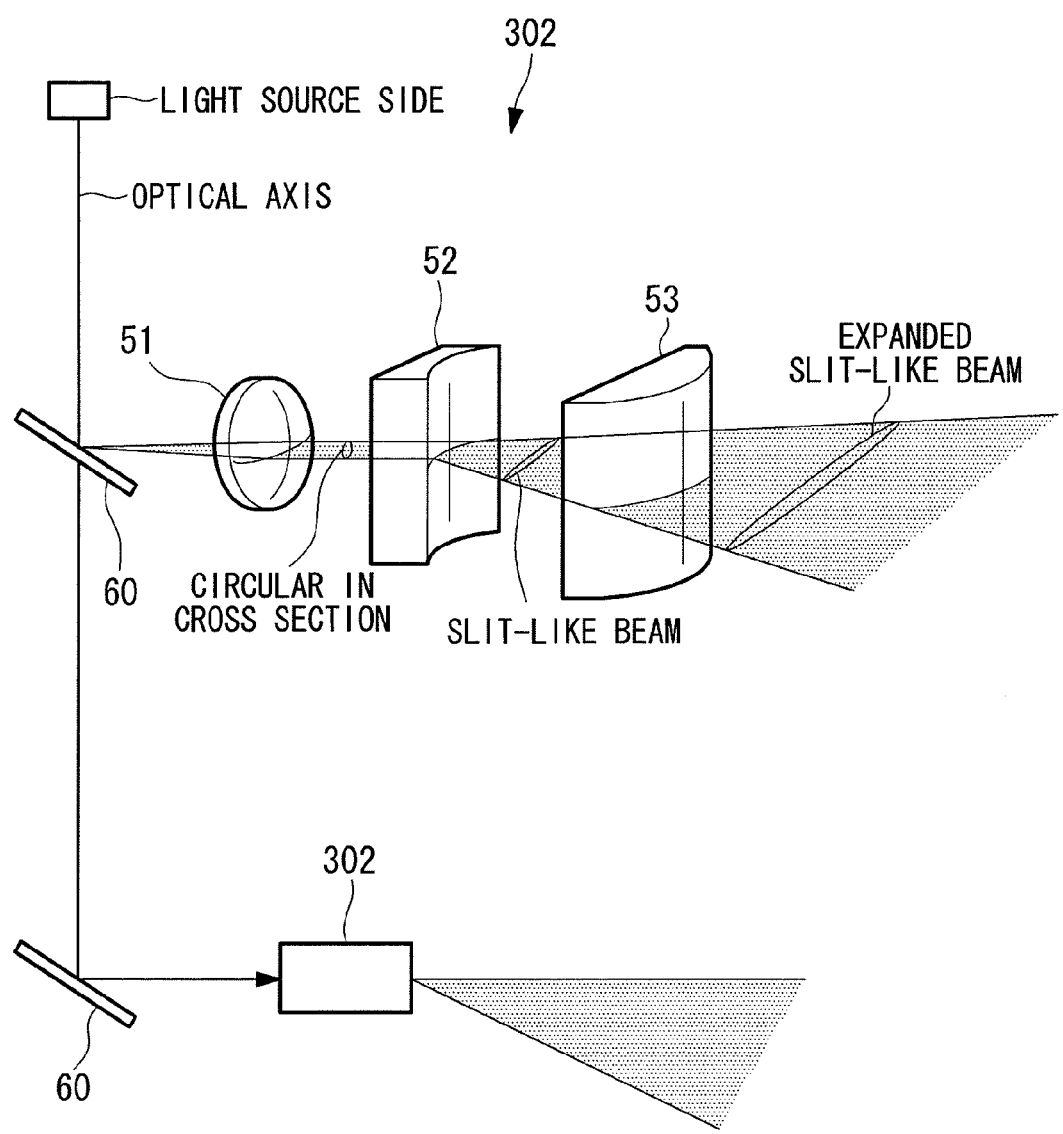
FIG. 2 is a diagram showing, in outline, the configuration of a transmitted-light lens system 113.

The slit-beam generators 302 are disposed on optical axes of the individual beams divided by the optical dividers 301. As shown in FIG. 2, for example, the slit-beam generators 302 are configured mainly having first convex lenses 51 that the divided beams enter, concave lenses 52 that the beams that have passed through the first convex lenses 51 enter, and second convex lenses 53 that the beams that have passed through the concave lenses 52 enter to expand the slit-like beams. In this embodiment, the first convex lenses 51 are spherical lenses, the concave lenses 52 are concave cylindrical lenses, and the second convex lenses 53 are convex cylindrical lenses.

In addition, in this embodiment, cross-sections of the beams perpendicular to their optical axes are larger (widened) when entering the concave lenses 52 than those at the transmitted-light end. Accordingly, the first convex lenses 51 are provided between the transmitted-light end and the concave lenses 52 in the slit-beam generators 302 so that the sizes of cross-sections of the beams are made equal (are not expanded) between the transmitted-light end and the concave lenses 52 before the beams enter the concave lenses 52.

Note that, in the surveillance device according to this embodiment, the slit-beam generators 302 are provided with the first convex lenses 51 because the divided beams are expanded; however, it is not limited thereto. For example, when the cross-sections of the divided beams perpendicular to the optical axes thereof are the same sizes between the transmitted-light end and the concave lenses 52, the slit-beam generators 32 need not be provided with the first convex lenses 51.

Specifically, the beams emitted from the laser-emitting end are collected by the spherical lenses provided on the optical axis thereof, after being divided by the optical dividers 301, and enter the concave cylindrical lenses as collimated beams. By passing through the concave cylindrical lenses, the incident beams are expanded only in lateral directions, thereby forming slit-like beams. Furthermore, by entering the convex cylindrical lenses, expansion angles of the beams that have been made slit-like are adjusted to desired angles, and the beams are subsequently radiated toward the search area at the sea surface.

The slit-beam generators 302 generate slit beams in this way from beams emitted from the laser-emitting end.

Figure 3:
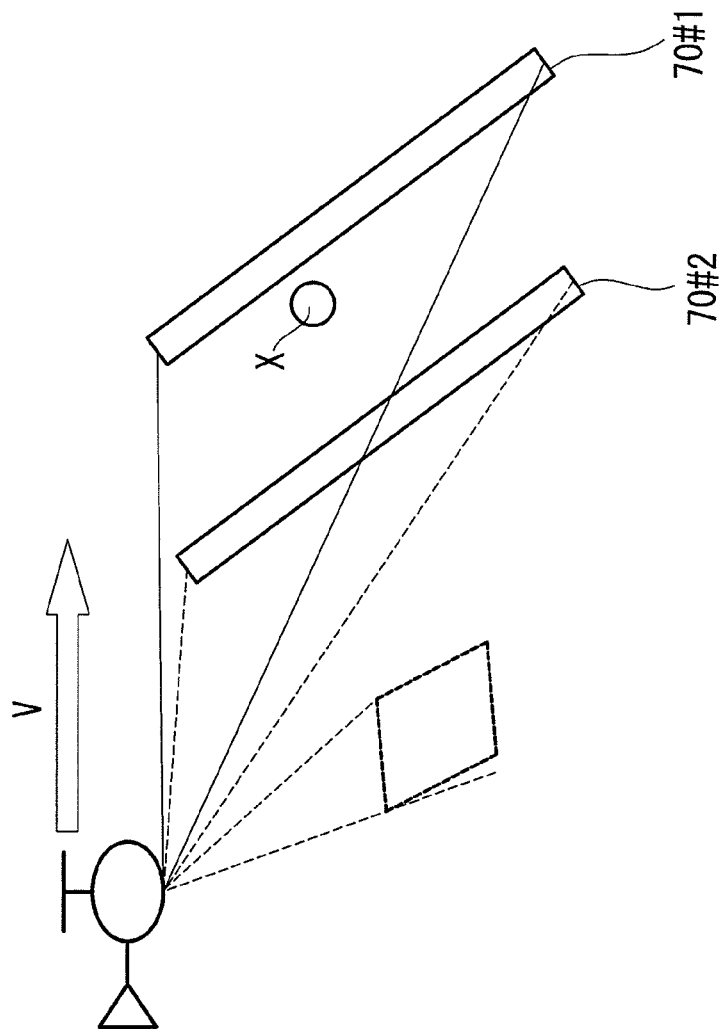
FIG. 3 is diagram showing, in outline, the configuration of a surveillance device employing slit-like beams.

FIG. 3 shows the plurality of slit-like beams generated as described above being radiated on the sea surface from the sky. Because the plurality of the slit-like beams are radiated at predetermined intervals in this way, after a slit beam 70#1 is radiated on the sea surface, another slit beam 70#2 behind it is radiated on the same area of the sea surface again. Accordingly, when waves block the slit beam 70#1 and a target object X cannot be detected, by radiating the slit beam 70#2 on the sea surface again, the possibility of detecting the target object X is increased. Because the plurality of the slit beams are radiated on the sea surface in this way, it becomes possible to increase the opportunities to search for the target object in one flight.

Furthermore, by defining the intervals of the plurality of the divided slit beams in advance, searching can be more efficiently performed.

Figure 4:
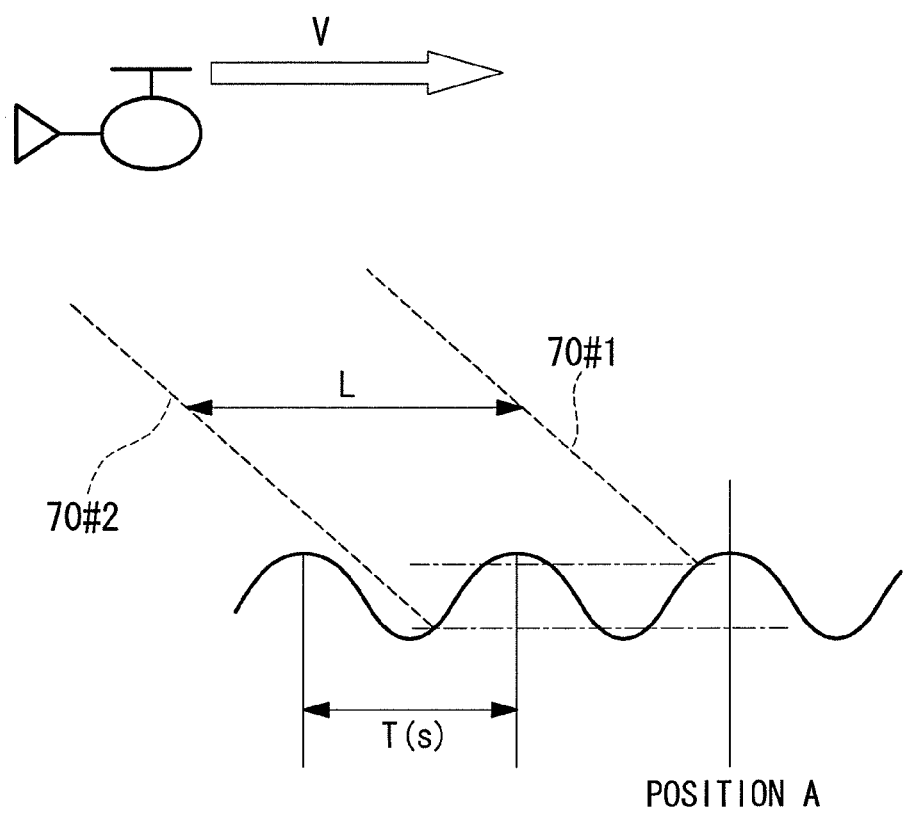
FIG. 4 is a diagram showing, in outline, the configuration for the case in which the slit-like beams are radiated onto waves from a flying aircraft.
Figure 5:
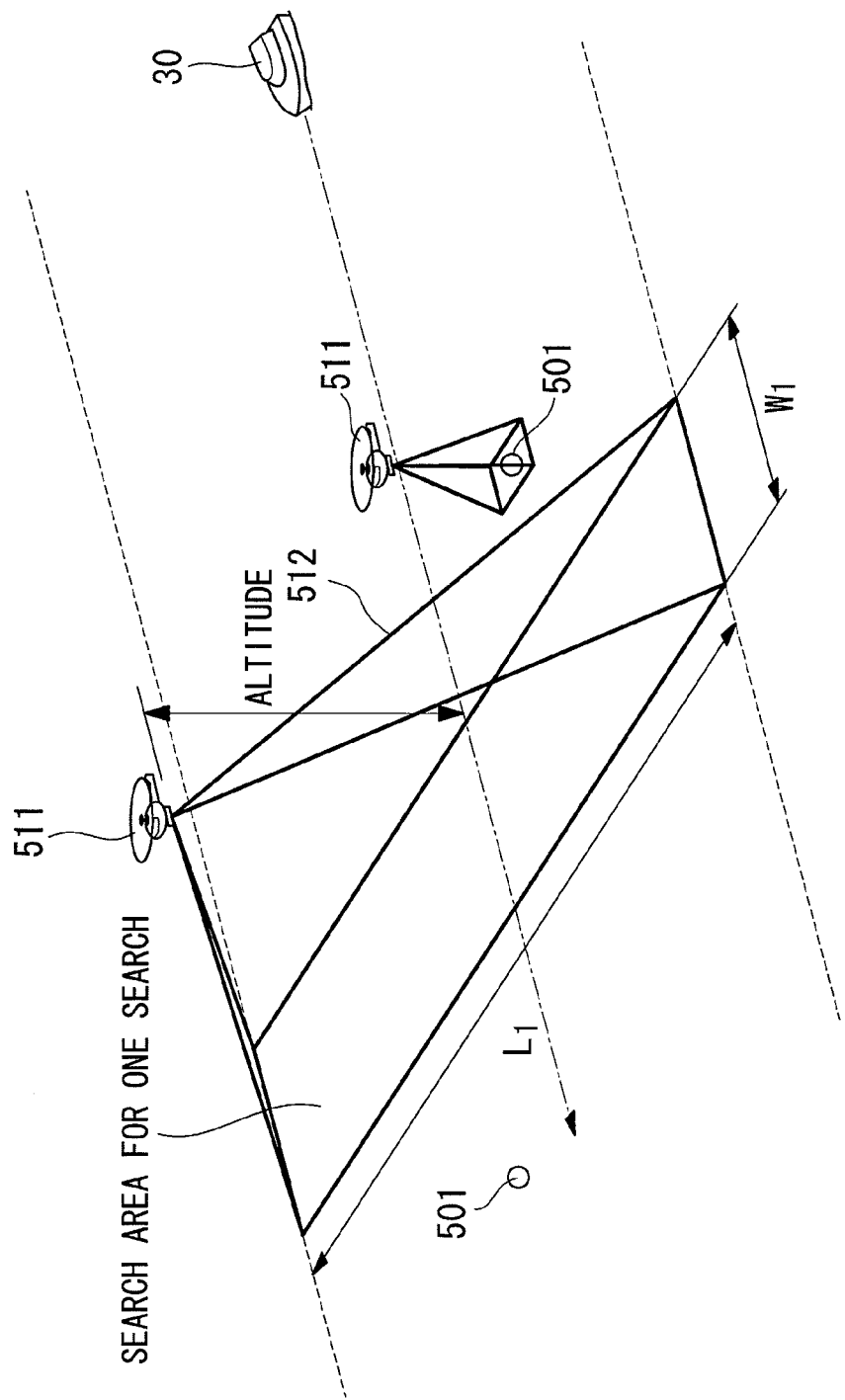
FIG. 5 is a diagram showing, in outline, the configuration of a conventional laser surveillance device.

Specifically, as shown in FIG. 4, the distance between the slit beams or the traveling velocity of a flying aircraft is adjusted so that a value obtained by dividing the traveling velocity V of the aircraft by the distance L between the slit beams does not coincide with the wave period T (seconds).

$$T \neq L/V \quad (1)$$

Specifically, information about the wave period and the traveling velocity of the flying aircraft is input from the input device 6. At the controller 3, which is described later, a calculation is performed with these input values in which the distance L between the slit beams is divided by the traveling velocity V of the flying aircraft, and it is determined whether or not expression (1) is satisfied. When expression (1) is not satisfied, one of the values is adjusted, thereby making adjustments so as to satisfy expression (1). When expression (1) is not satisfied, for example, the controller 3 outputs signals for controlling the slit-beam-radiation direction deflector 303 to the laser-radar control unit 2, and thus, the distance L between the slit beams is automatically adjusted.

In addition, in the surveillance device according to this embodiment, the distance L between the slit beams is automatically adjusted when expression (1) is not satisfied; however, it is not limited thereto. For example, it may be reported on the display device 4 that the distance L between the slit beams needs to be changed, and the distance L may be changed by surveillance personnel. Furthermore, a parameter to be adjusted is not limited to the distance L, and it may be the traveling velocity V of the aircraft. For example, it may be reported on the display device 4 that the traveling velocity of the aircraft needs to be adjusted, and the velocity of the aircraft may be changed by the surveillance personnel, or the velocity of the aircraft may be automatically adjusted.

The slit-beam-radiation direction deflector 303 adjusts the directions in which the slit beams are radiated and adjusts the distance L between the slit beams. Specifically, the slit-beam-radiation direction deflector 303 adjusts the distance L between the slit beams by adjusting a radiation angle (incident angle) of at least one adjacent slit beam with respect to the sea surface. By doing so, the distance L between the slit beams can be adjusted simply.

By adjusting the distance L between the slit beams or the traveling velocity V of the aircraft in this way so as to satisfy expression (1), positions of waves irradiated with the plurality of the slit beams can be changed; therefore, when a target object exists, irradiating the same positions of the waves is avoided, and the target object can be efficiently found.

The light-receiving portion 12 is configured having, for example, a zoom lens 123, a received-light shutter 122, and an ICCD (image-intensifier CCD) camera head 121. The zoom lens 123 collects reflected beams of beams emitted from the light-transmitting portion 11 and reflected at the surveillance target and guides them to the received-light shutter 122. The received-light shutter 122 is formed of, for example, a high-speed gate device or the like that can be opened and closed, is operated by the shutter control unit 24 provided inside the laser-radar control unit 2, which is described later, and inputs the beams guided thereto by the zoom lens 123 to the ICCD camera head 121 or blocks them. The ICCD camera head 121 converts the acquired beams to electrical signals to generate image signals and outputs the image signals to an image processor 25 inside the laser-radar control unit 2.

Such a laser radar 1 has a structure in which rotation angles and pitch angles are adjusted to desired angles by the swiveling base 5.

The laser-radar control unit 2 controls the light-transmitting portion 11, the light-receiving portion 12, and the swiveling base 5 of the above-described laser radar 1 on the basis of various control signals supplied from the controller 3. The laser-radar control unit 2 is provided with, for example, a swiveling base driving unit 21, a synchronization circuit 22, a control-signal converter 23, the shutter control unit 24, the image processor 25, the laser power source 26, and a processor (decision unit) 27 and so on.

The controller 3 generates various control signals for controlling the laser radar 1, outputs various control signals generated therein to the laser-radar control unit 2, and outputs surveillance results supplied from the laser-radar control unit 2 to the display device 4. In addition, the controller 3 is connected to the input device 6 and supplies the laser-radar control unit 2 with the information input from the input device 6.

The display device 4 is provided with a display monitor (not shown) that displays acquired images, surveillance results, etc. input from the controller 3.

In addition, with the control by the controller 3, the processor 27 of the laser-radar control unit 2 performs processing for deciding whether a detected object is the target object or not from the image signals and information about reflected beams received from the image processor 25. Furthermore, when the detected object is the target object, the controller 3 displays information indicating this under the control of the controller 3.

Specifically, on the basis of intensities of reflected beams, positional information, the number of times reflected beams that exceed a predetermined intensity are received, or the like, the processor 27 determines whether the reflected beams are due to the influence of the waves (noise) or due to the target object. For example, when the reflected beams are due to the target object, the number of times the reflected beams are obtained is large, and it is expected that the intensities and positions of the reflected beams are stabilized to some extent. When the reflected beams are due to the waves, however, the number of times the reflected beams are obtained is small, and the intensities and positions thereof become variable. In this way, it is possible to determine whether or not the object causing the reflected beams is the target object on the basis of the reflected beams and information about the reflected beams.

Note that, in the surveillance device according to this embodiment, the processor 27 determines whether or not an object found on the basis of the reflected beams is the target object, and the judgment result is displayed on the monitor of the display device 4; however, it is not limited thereto. For example, the image processor 25 may apply predetermined image processing to the information about the reflected beams; the image signal to which the image processing has been applied may be input to the controller 3 via a control-signal converter 23; and the image signal may be output to the display device 4 from the controller 3. Then, the surveillance personnel may determine whether or not the object is the target object on the basis of the monitor display output to the display device 4.

The laser-radar control unit 2 and the controller 3 described above have built-in computer systems including, for example, a CPU (Central Processing Unit), HD (Hard Disc), ROM (Read Only Memory), RAM (Random Access Memory), and so on. A series of processing procedures for realizing the individual functions described later are stored in the HD or ROM etc. in the form of a program, and the CPU loads this program into RAM etc. and executes information processing and computational processing, thereby realizing the individual functions described later.

Next, the operation of the surveillance device according to this embodiment will be described.

First, during surveillance, the controller 3 generates synchronization control signals that are required to continuously emit pulsed laser beams at a predetermined pulsing cycle. In addition, shutter operating signals, etc. for acquiring, with the light-receiving portion 12, only reflected beams of the pulsed laser beams that have reached and have been reflected at an object located at a surveillance distance are generated and output to the laser-radar control unit 2 together with the synchronization control signals.

The synchronization control signals output from the controller 3 are supplied the laser power source 26 and the shutter control unit 24, respectively, via the control-signal converter 23 inside the laser-radar control unit 2.

Upon receiving the synchronization signals, the laser power source 26 supplies power to the laser oscillator 111 inside the light-transmitting portion 11 provided in the laser radar 1. Accordingly, laser beams are continuously emitted from the laser oscillator 111.

On the other hand, the shutter control unit 24 synchronously operates the transmitted-light shutter 112 of the light-transmitting portion 11 and the received-light shutter 122 of the light-receiving portion 12, which are provided in the laser radar 1, on the basis of the synchronization signals input from the controller 3.

Accordingly, first, laser beams, which are continuous beams, are emitted from the laser oscillator 111 with the power supplied from the laser power source 26. By being guided to the transmitted-light shutter 112, which is opened and closed at certain intervals, the laser beams are transmitted and blocked at certain time intervals and are converted to intermittent laser beams. The intermittent laser beams are made incident on the transmitted-light lens system 113.

At the transmitted-light lens system 113, the laser beams are emitted and are divided into a plurality of beams by the optical dividers 301, such as the half-mirror 60 or the like, provided on the optical axes of the laser beams. At the slit-beam generators 302, the individual divided beams are converted to slit-like laser beams by passing through the individually provided first convex lenses 51, the concave lenses 52, and the second convex lenses 53 of the transmitted-light lens systems 113 and are radiated on the sea surface. At this time, because each of the slit-like laser beams is adjusted so as to satisfy the above-described expression (1) ($T \neq L/V$), where values of the distance L of the slit beam and the traveling velocity V of the flying aircraft do not coincide with the wave period T (second), the slit beams can be prevented from being radiated on the same positions of the waves, thereby making it possible to improve the search capability. In addition, when the above-described expression (1) ($T \neq L/V$) is not satisfied, the angles at which the slit beams are radiated on the sea surface are adjusted at the slit-beam-radiation direction deflector 303, and the distance L between the slit beams is adjusted.

The laser beams reflected by an object existing in the irradiation area are acquired by the ICCD camera head 121 via the zoom lens 123 of the light-receiving portion 12 and via the received-light shutter 122 that is synchronously opened and closed with the transmitted-light shutter 112. In this case, the transmitted-light shutter 112 and the received-light shutter 122 are opened and closed in synchronization with each other; therefore, it is possible to emit the laser beams from the light-transmitting portion 11 at the timing at which the reflected beams are acquired by the ICCD camera head 121. Accordingly, the laser beams emitted from the light-transmitting portion 11 can be effectively utilized.

Then, the information about the reflected beams acquired by the ICCD camera head 121 is converted to image signals, which are electrical signals, which are output to the image processor 25 inside the laser-radar control unit 2.

At the image processor 25, during one frame period between opening and closing of the ICCD camera head 121, a plurality of images generated on the basis of the reflected beams acquired by opening and closing of the received-light shutter 122 are accumulated. Then, a surveillance image is created by integrating (superimposing) the accumulated plurality of images, and the surveillance image is output to the processor 27.

At the processor 27 that has received the image signals and the information about the reflected beams, it is determined whether or not the detected object is the target object. In addition, the judgment result is input to the controller 3 via the control-signal converter 23, and the surveillance image input to the controller 3 is output to the display device 4. Accordingly, the detected object is displayed on the display monitor of the display device 4 as information indicating that "it is the target object". As a result, by having the surveillance personnel or the like check the image displayed on the display monitor, it is possible to obtain information regarding whether or not the object that exits in the irradiation area is the target object.

As has been described above, with the surveillance device according to this embodiment, by irradiating the sea surface with the plurality of slit beams at the predetermined intervals, it is possible to improve the probability of finding an object that exists in the irradiation area from the sky in one flight.

In addition, whether or not the object is the target object is determined on the basis of the reflected beams received at the light-receiving portion 12, and the result thereof is displayed on the display monitor; therefore, the surveillance personnel or the like can easily ascertain whether or not it is the target object by checking the monitor display.

Furthermore, the distance L between the slit beams of the plurality of the laser beams is adjusted on the basis of the wave period and the velocity of the flying aircraft, which are specified via the input device 6. Accordingly, when searching for information about an object, it is possible to avoid monitoring the same positions within the lengths of the waves; therefore, it is possible to efficiently perform surveillance.

{First Modification}

Note that, when an object detected on the basis of the reflected beams is the target object, the surveillance device according to this embodiment reports this on the display monitor of the display device 4 and informs the surveillance personnel; however, the notifying method in the case where the object is the target object is not limited thereto.

For example, when the detected object is the target object, a second image acquisition device 200 may be directed in a direction of the target object, and detailed information thereof may be displayed at the display device 4. Accordingly, when the target object is detected, the surveillance personnel can obtain specific information about the target object by checking the display monitor of the display device 4.

{Second Modification}

Although the surveillance device according to this embodiment employs the laser beam as the light source, it is not limited thereto. For example, under fair weather or when observation conditions are good, a flash lamp or continuous beam, such as LED or the like, may be employed. In addition, switching between use of the laser beam and use of a continuous beam may be performed on the basis of the judgment of the surveillance personnel or may be automatically performed by the device itself on the basis of image quality or states of received signals.

When observing with the continuous beam in this way, because omissions in an irradiation area and a surveillance area are reduced, search efficiency can be improved. In addition, because synchronizing control of shutter devices, etc. is not required, it is possible to reduce the burden on the device.

Note that, with the above-described embodiment, the transmitted-light shutter 112 is provided between the laser oscillator 111 and the transmitted-light lens system 113, and irradiation timing of the laser beams emitted from the light-transmitting portion 11 is controlled by opening and closing the transmitted-light shutter 112 in synchronization with the received-light shutter 122 provided in the light-receiving portion 12; however, alternatively, for example, the timing at which the laser oscillator 111 emits the laser beam may be controlled by electrical signals that are synchronized with the received-light shutter 122. By controlling the timing at which the laser oscillator 111 emits the laser beam in this way, the transmitted-light shutter 112 can be eliminated and the device can be simplified.

In addition, in the case in which the plurality of slit beams are generated, the surveillance device according to this embodiment is provided with the optical dividers 301, such as the half-mirror 60, etc., in the light-transmitting portion; however, it is not limited thereto. For example, a plurality of light sources may be provided without providing the optical dividers 301.

REFERENCE SIGNS LIST 1 laser radar
2 laser-radar control unit
3 controller
4 display device
5 swiveling base
6 input device
11 light-transmitting portion
12 light-receiving portion
27 processor
111 laser oscillator
112 transmitted-light shutter
113 transmitted-light lens system
121 ICCD camera head
122 received-light shutter
123 zoom lens
301 optical divider
302 slit-beam generator
303 slit-beam-radiation direction deflector

The invention claimed is:

1. A surveillance device that is installed in a flying aircraft in the sky and that monitors the situation at a sea surface from the sky, the device comprising:
    a light-transmitting portion that is provided with a light source and that radiates a plurality of slit-like beams at predetermined intervals from the sky toward a search area at the sea surface;
    a light-receiving portion that receives a plurality of reflected beams that have been reflected by an object at the sea surface; and
    a decision unit that determines whether or not the object at the sea surface that has reflected the beams is a target object from information about the reflected beams obtained by the light-receiving portion.

2. A surveillance device that is installed in a flying aircraft in the sky and that monitors the situation at a sea surface from the sky, the device comprising:
    a light-transmitting portion that is provided with a light source and that radiates a plurality of slit-like beams from the sky toward a search area at the sea surface;
    a light-receiving portion that receives a plurality of reflected beams that have been reflected by an object at the sea surface;
    a decision unit that determines whether or not the object at the sea surface that has reflected the beams is a target object from information about the reflected beams obtained by the light-receiving portion; and
    an input device for inputting a wave period and traveling velocity of the flying aircraft,
    wherein the distance between the slit-like beams or the traveling velocity of the aircraft is adjusted so that a value obtained by dividing the distance between the slit-like beams by the traveling velocity of the flying aircraft does not coincide with the wave period.

3. The device of claim 1, wherein the light-transmitting portion includes
    a light source,
    at least an optical divider that is provided on an optical axis of a light emitted from the light source and that divides an incident light into individual beams, and
    a slit-beam generator that is provided on an optical axis of one of the individual beams divided by the optical divider and that generates a slit-like beam from the incident light.

4. The device of claim 3, wherein the slit-beam generator includes
    a concave lens that said one of the individual beams divided by the optical divider enters, and
    a convex lens that said one of the individual beams enters after passing through the concave lens, and that expands the slit-like beam to a desired angle.

5. The device of claim 1, further comprising an image acquisition device that is directed to a finding direction when a target object is found by the decision unit.

6. The device of claim 1, wherein the light-transmitting portion is provided with a light source that radiates a continuous beam, and the light-receiving portion receives a reflected beam as the continuous beam.

7. The device of claim 1, wherein the light-transmitting portion is provided with a flash lamp or LED as the light source.

8. A surveillance method that is implemented in a flying aircraft in the sky, for monitoring the situation at a sea surface from the sky, the method comprising:
   radiating a plurality of slit-like beams at predetermined intervals from the sky toward a search area at the sea surface;
   receiving a plurality of reflected beams that have been reflected by an object at the sea surface; and
   determining whether or not the object at the sea surface that has reflected the beams is a target object from information about the reflected beams.

9. The method of claim 8, further comprising adjusting the predetermined interval of the slit-like beams based on a wave period of the sea surface.

10. The method of claim 8, further comprising:
    inputting a wave period and traveling velocity of the flying aircraft; and
    adjusting the distance between the slit-like beams or the traveling velocity of the aircraft so that a value obtained by dividing the distance between the slit-like beams by the traveling velocity of the flying aircraft does not coincide with the wave period.

11. The method of claim 8, wherein said radiating operation is performed using a light-transmitting portion, and
    wherein the light-transmitting portion includes a light source, at least an optical divider that is provided on an optical axis of a light emitted from the light source and that divides an incident light into individual beams, and a slit-beam generator that is provided on an optical axis of one of the individual beams divided by the optical divider and that generates a slit-like beam from the incident light.

12. The method of claim 11, wherein the slit-beam generator includes
    a concave lens that said one of the individual beams divided by the optical divider enters, and
    a convex lens that said one of the individual beams enters after passing through the concave lens, and that expands the slit-like beam to a desired angle.

13. The method of claim 8, further comprising directing an image acquisition device in a finding direction when a target object is found in said determining operation.

14. The method of claim 8, wherein said radiating operation is performed using a light-transmitting portion,
    wherein said receiving operation is performed using a light-receiving portion, and
    wherein the light-transmitting portion is provided with a light source that radiates a continuous beam, and the light-receiving portion receives a reflected beam as the continuous beam.

15. The method of claim 8, wherein said radiating operation is performed using a light-transmitting portion, and
    wherein the light-transmitting portion is provided with a flash lamp or LED as the light source.

16. The device of claim 2, wherein the light-transmitting portion includes
    a light source,
    at least an optical divider that is provided on an optical axis of a light emitted from the light source and that divides an incident light into individual beams, and
    a slit-beam generator that is provided on an optical axis of one of the individual beams divided by the optical divider and that generates a slit-like beam from the incident light.

17. The device of claim 16, wherein the slit-beam generator includes
    a concave lens that said one of the individual beams divided by the optical divider enters, and
    a convex lens that said one of the individual beams enters after passing through the concave lens, and that expands the slit-like beam to a desired angle.

18. The device of claim 2, further comprising an image acquisition device that is directed to a finding direction when a target object is found by the decision unit.

19. The device of claim 2, wherein the light-transmitting portion is provided with a light source that radiates a continuous beam, and the light-receiving portion receives a reflected beam as the continuous beam.

20. The device of claim 2, wherein the light-transmitting portion is provided with a flash lamp or LED as the light source.

* * * * *